United States Patent Office 2,700,823
Patented Feb. 1, 1955

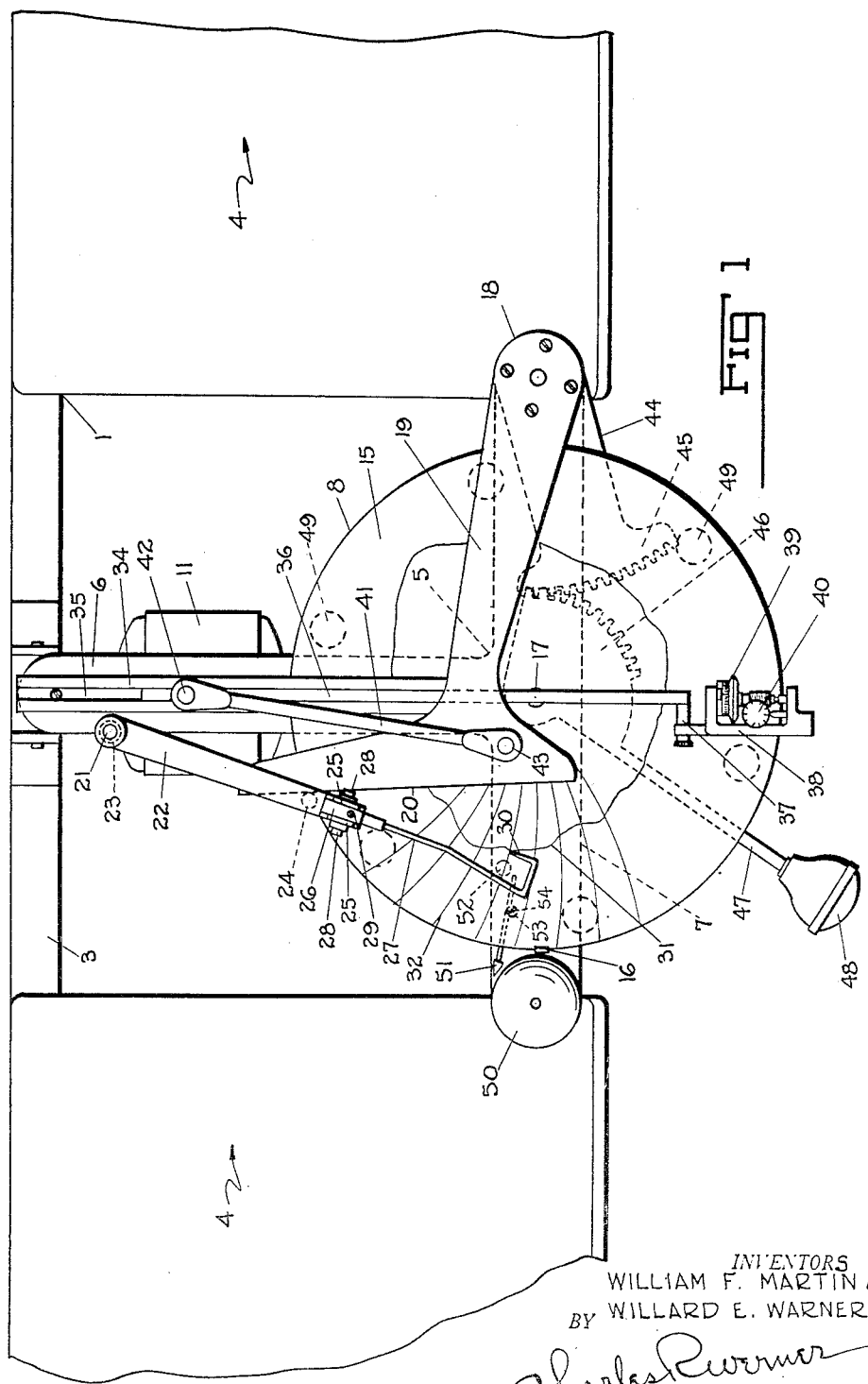

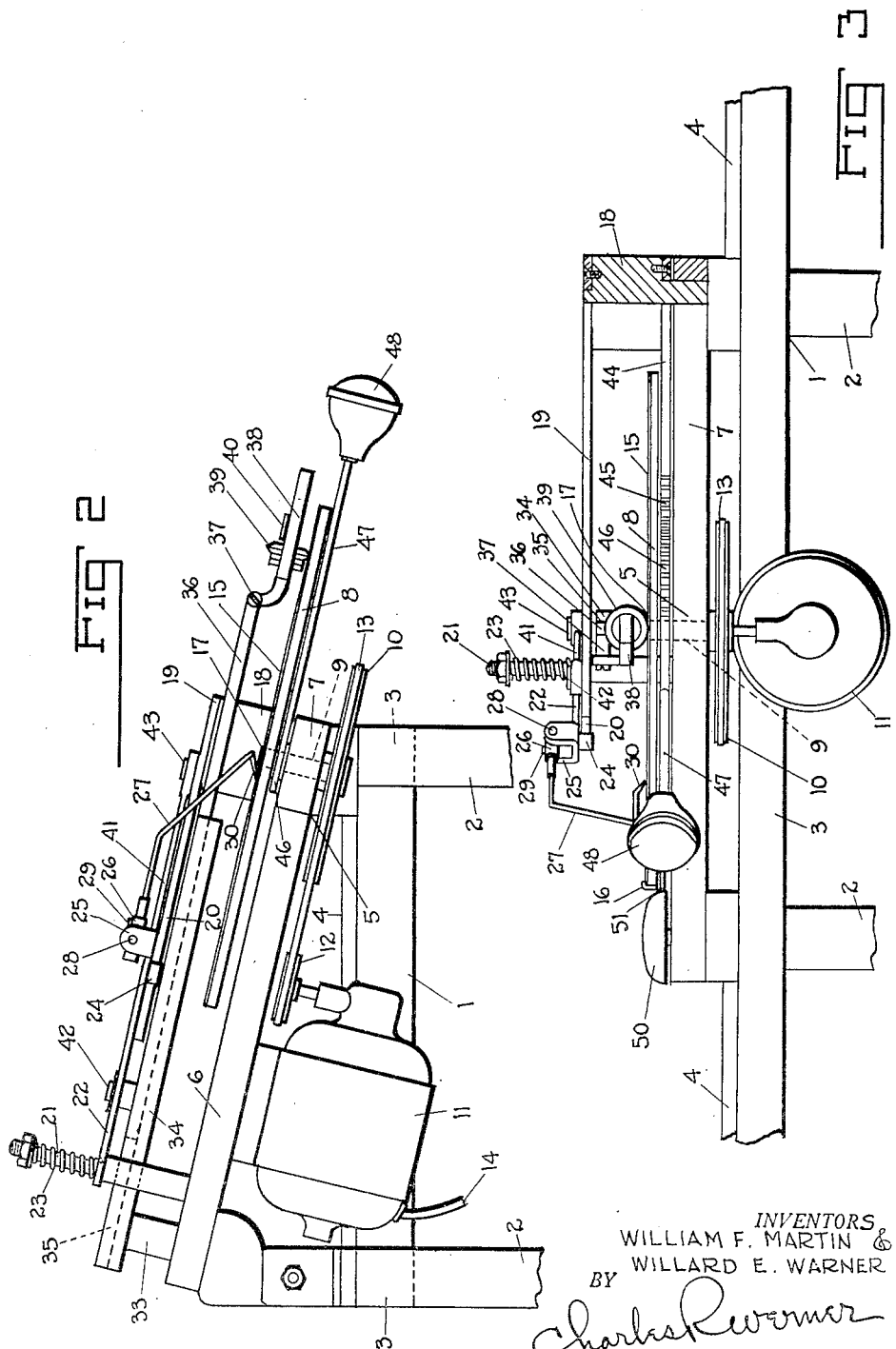

2,700,823

CHART CALCULATOR

William F. Martin, Amarillo, Tex., and Willard E. Warner, Hooker, Okla.

Application September 3, 1949, Serial No. 113,926

8 Claims. (Cl. 33—1)

This invention relates in general to calculating machines and in particular to a calculator for use with orifice meter charts.

Generally, such charts carry recordings of static and differential pressures obtained for a given well or orifice under certain conditions. The calculators used with such charts, as a rule, are adapted to obtain the square root of the product of the recorded lines, which figure is multiplied by various factors, coefficients, and/or other values to obtain a useable result in actual quantity of gas or other fluid which has passed through the orifice meter.

This invention is a simplification over the devices shown in my previous Patents No. 2,166,845, issued July 18, 1939, for "Calculating Machines" and No. 2,212,323, issued August 20, 1940, for "Calculator." In both of these patented devices, the "coefficient" is applied to the machine before making the calculation and the final result is an actual quantity figure which requires no further calculation. Also, in the patented devices, two styli are employed, one to follow the static pressure line and the other to follow the differential pressure line.

During many years of observation and contact with users of orifice meter chart calculators, our attention has been focused on several factors which prompted the conception of the invention herein described and claimed.

First, was the fact that all the calculating machines commercially available for orifice meter work, including the previously patented devices were relatively complicated and high in cost for many potential users. The previously patented devices, hereinbefore mentioned, appeared to be the least expensive ones which would perform a complete calculation.

It was obvious that the only way to effect a substantial reduction in the cost of a calculator of this nature was to eliminate some of its functions. One other fact which long years of observation revealed was that the majority of charts showed a relatively uniform static pressure recording. On about 95% of the charts it was possible to visually estimate the average static pressure, making it unnecessary to run the static pressure extension, the estimated amount being used in a further calculation after the differential pressure extension is obtained.

Eliminating the function of obtaining the static pressure extension and multiplying it by the differential pressure extension, and also eliminating the function of injecting the chart "coefficient" into the machine calculation made it possible to develop a calculating machine which could be simply and inexpensively manufactured and made available to potential purchasers within a price range lower than heretofore possible.

In essence, then, with our simplified device, the average square root of the differential pressure of the chart would be determined, the average static pressure would be estimated by inspection, and the chart "coefficient" would be observed on the chart itself. These three figures would be multiplied on any standard machine calculator available in most offices, and a final result would be obtained which would represent the actual quantity of gas or other fluid which has passed through the orifice meter during the period represented by the chart.

The "coefficient" represents a correction factor based on a number of components such as static and differential pressures, pressure base, gravity, inside pipe diameter, flowing temperature, size of orifice, etc. Coefficient tables are made up for each meter and are entered on the charts used on the meter. In general, the coefficient represents the quantity of gas (or other fluid) passing through a meter under a given set of conditions in a given time at given absolute, static pressure and a given differential pressure.

One other reason for the conception of the simplified calculator is that a chart which records the flow of non-compressible liquids such as oil or water only has one recorded line. Consequently, only a single stylus machine is needed which would obtain the average square root of the line on the chart.

It is the primary object of our invention, therefore, to provide a calculating device of the class described employing a rotatable chart table adapted to receive a chart, a stylus for following line recordings on the chart, a proportional cam actuating the stylus, and a counting device engaging the chart table and actuated by rotative movement thereof, said counting device being proportionally movable diametrically on the chart by movement of the cam.

Another object of the invention is to provide a resilient member normally urging the stylus into engagement with the cam.

Still another object of our invention is to so construct and arrange the stylus point in relation to the chart on the table that following of the recorded line by the stylus will be facilitated, with no shadow, parallax or interference by the stylus.

And another object of the invention is to provide a cam so constructed, arranged and related to the stylus as to impart proportional movement between said stylus and cam, the proportion being direct, square root, logarithmic or otherwise, depending on the cam employed, means being provided for changing cams to fit the function of the calculator.

And one more object of the invention is to provide a proportional linkage between the cam and the counting device for actuating the latter diametrically on the chart table.

And still another object of the invention is to provide manual means for swinging the cam to actuate the stylus and the counting device.

One more object of our invention is to provide a rectilinear guide for the counting device to move it diametrically on the chart table.

Another object of our invention is to arrange the arc of swing of the stylus to coincide as closely as possible with the arc of the time lines on the chart.

And another object is to provide in combination with the calculating device, a supporting table carrying the calculator at a chart table angle of approximately 13° which we have found most suitable for viewing and handling by the operator.

Other objects and advantages, as well as the construction and operation of the invention will be apparent by reference to the following description in connection with the accompanying drawings in which:

Fig. 1 is a top plan view of the calculating machine comprising our invention showing a fragmentary part of the special table on which the machine is mounted.

Fig. 2 is a side elevational view of the calculating machine with certain minor parts being omitted in order not to obscure other parts, and Fig. 3 is a front auxiliary elevation of the device parallel to the chart table, parts being shown in section for clarity.

Referring now to the drawings by numerals of reference, 1 indicates a suitable stand or table for my device with legs 2, rails 3 and working surfaces 4.

A T-shaped frame 5 is suitably carried by the stand 1 and has a rearwardly disposed leg 6 and a frontal transverse leg 7. At the juncture of the legs 6 and 7 is suitably journaled a chart turntable 8, the shaft 9 carrying a pulley 10 at the lower end thereof, said pulley being driven by motor 11 through pulley 12 and belt 13. The motor may be suitably supported from the leg 6 and may have suitable reduction gearing or any other form of drive for obtaining the desired operating speed for the chart table 8.

The motor connects to a suitable power and control source through conduit 14, the control being a foot rheostat or the like (not shown).

The chart 15 rests flat on the chart table 8 and a detent or stop 16 as well as end 17 of shaft 9 aids in the proper concentric positioning of the chart, stop 16 also acting as a reference point for the start of the calculation as hereinafter explained.

At the right hand end of leg 7 is pivotally mounted a pivot post 18 to which is detachably mounted cam lever 19 extending over the chart table. A cam surface 20 is provided on the lever 19 and this surface may be so constructed and arranged as to provide for average, square root, logarithmic or other results, interchangeable cams being used for the desired results.

Adjacent the rear of the leg 6 is secured an upright post 21, a stylus arm 22 being freely swingable on said post. A spring 23 positioned about the post 21 engages the arm 22 and the post 21 and is adapted to urge the stylus arm toward the cam lever 19, the bottom surface of the stylus arm 22 carrying a suitable roller bearing 24 which is adapted to engage the cam face or surface 20 at all times.

The stylus arm 22 has a pair of upstanding lugs 25 between which is carried stylus head 26 from which extends the stylus 27, set screws 28 in the lugs 25 and set screw 29 in the stylus head 26 permitting accurate setting and adjustment of the stylus in relation to the chart table.

The end of the stylus has a pointed member 30 which is angularly disposed to the plane of the chart table and inclines downwardly in a direction opposite to that in which the chart table rotates.

As illustrated, the chart table rotates counterclockwise. Should the table turn in a clockwise direction, the stylus tip 30 would incline in a direction opposite to that illustrated. The purpose of this arrangement is to provide the most efficient relation between the stylus tip 30 and the recorded line 31 on the chart 15 so that the operator can easily and effectively follow said line 31 with a minimum of lag, parallax, shadow and interference. With good visibility he can anticipate movements and can react quicker to variations in the recorded line.

The length of the stylus arm 22 and the arc of swing of said arm are so designed that the stylus point 30 will move along an arc substantially the same as the arc of the time lines 32 on the chart.

At the rear end of leg 6 of the frame 5 is a standard or post 33 carrying an elongated guide 34 extending over the chart table and in alignment with the central axis thereof. The guide is provided with a groove 35 in which is slidably positioned the counter assembly carrier or bar 36, the forward end of which has a pivot post 37 carrying counter head 38, a counter wheel 39 and vernier 40 of well known construction being carried by the head 38.

The counter wheel rests on the chart 15 on the table 8 and is adapted to be actuated by rotation of the chart table.

In order to effect longitudinal movement of the counter bar 36 we have linked it to the cam lever 19 through linkage bar 41 pivoted at 42 to the counter bar 36 and at 43 to the cam lever 19. Proportional movement of the counter is obtained by the construction and arrangement of this linkage.

The pivot post 18 carries an arm 44 with gear segment 45 arranged to mesh with gear segment 46 positioned about the shaft 9 concentrically with the chart table 8 and freely movable in relation thereto. Both gear segments are disposed between the chart table and the T-frame 5.

A hand 47 extends from the gear segment 46 to a point beyond the outer periphery of the chart table 8 and is provided with a knob 48 which can be grasped by the operator for manipulation of the gear segments and cam lever.

Turntable 8 may be provided with a plurality of spaced openings 49 to permit insertion of finger for easy removal of charts. At the left hand side of front bar 7 is an alarm bell 50, a bell knocker 51 being suitably pivoted to frame 7 below the chart table 8, said bell knocker being engagable by detent 52 carried on the under surface of the chart table. A spring 53 about the pivot post 54 of the knocker will return the knocker to a position clear of the bell 50 after engagement by the detent 52.

*Operation*

In operating the calculating device, the chart 15 which is to be run is placed in proper position on the chart table 8 with the starting point, which normally would be the zero hour line on the chart, adjacent the detent or stop 16. This stop is so related to the detent 52 that the bell knocker 51 will be actuated and the bell will be struck just before a complete revolution of the chart table is made, thus serving as a warning.

The counter head 38 may be swung up before insertion of the chart to clear said chart. The stylus remains in operating position during chart insertion and removal as it will not interfere with easy application and removal of the chart which is slipped in between the stylus and the chart table.

Although a reading of the counter can be taken and later subtracted from the final reading, the counter is so designed that it can be easily and quickly zeroized by hand, prior to running the chart; that is the preferred manner of operation.

With the chart 15 in proper position on the chart table 8 and the counter set at zero, the operator grasps knob 48 with one hand and operates a suitable motor control with his foot or knee or in any well known and suitable manner. Activation of the motor 11 will cause rotation of the chart table 8, in the presently illustrated form of my invention, in a counterclockwise direction. Reduction gearing or any other suitable means may be used to obtain the desired angular velocity of the chart table.

As the chart table rotates the knob 48 is manipulated so that the stylus point 30 will closely follow recorded line 31 on the chart 15. Actuation of the stylus point is effected through the gear segments 46 and 45, pivot post 18, cam lever 19 and cam face 20, the latter bearing against roller 24 on stylus arm 22, with spring 23 urging the roller and cam face into continuous intimate contact.

The counting device will respond to movements of the cam lever 19 through linkage bar 41 and will be guided longitudinally and diametrically in respect to the chart by guide 34. When a square root cam face 20 is used the counter will move a distance equal to the square root of the distance of movement of the stylus.

When a complete revolution of the chart table is almost completed the bell 50 will sound to warn the operator who will release the motor control when the stylus has traversed the full chart recording. The counter reading is noted and recorded on the chart which is then removed. The movements of the cam are proportional to the stylus movements and the cam lever transmits proportional longitudinal movements to the counter, the wheel of which is being rotated by rotation of the chart table, the final result being an average, a squart root average or logarithmic average depending on the cam face 20 used. By using interchangeable cam levers with predesigned face 20, any desired result, within the capabilities of the device, may be obtained.

In the present device the result represents the average square root of the differential pressure or the static pressure. On certain charts the differential pressure line is the only one appearing thereon, and the complete calculation will include the result obtained by running the chart (or the chart extension as it is called), multiplied by the chart coefficient or other factors.

Where a static pressure line appears on the chart its average can be estimated visually, recorded on the chart and then used in the final calculation.

Although we have found that 95% of the charts have a fairly uniform static pressure recording which can easily be averaged by eye, in the event an accurate estimate cannot be made because of irregularities in the static pressure line, the chart can be rerun, with the stylus following the static pressure line, to obtain an average square root of the static pressure reading on the counter.

From the foregoing it will be apparent that we have provided a relatively simple and efficient calculating machine which will quickly and easily "run" an orifice meter chart to obtain the average, average square root or average logarithmic value of the recorded lines thereon, the simplicity of the device lending itself to inexpensive construction placing it within the financial reach of a large number of potential users.

It is obvious that changes in form, proportion and details of construction may be resorted to without departing from the spirit of my invention and we reserve the rights to all changes which come within the scope of these specifications and the claims which follow.

What we claim as new and desire to secure by Letters Patent is:

1. In a calculating machine, a rotatable chart table adapted to receive a chart, a stylus for following line recordings on the chart, a cam actuating the stylus, a pivotable cam support supporting said cam clear of the chart table, a counting device, a counter wheel on the counting device engaging the chart table and rotatively movable when the chart table is rotated, a support for the counting device, link members between the counting device and the cam whereby movement of the cam will import longitudinal movement diametrically across the chart table of the counting device on its support, and manually operated gear segments for actuating the cam pivot to impart swinging movement to the cam.

2. In a calculating machine, a rotatable chart table adapted to receive a chart, a pivoted stylus for following line recordings on the chart, a pivoted member for imparting movement to the stylus, a cam face on said pivoted member so constructed and related to the stylus as to impart a proportional movement thereto, a counting device, a counter wheel on the counting device engaging the chart table and actuated by rotative movement thereof, a support for the counting device arranged diametrically over the chart table, a linkage between said pivoted member and the counting device so constructed and arranged as to impart rectilinear movement to the counting device in its support diametrically on the chart table.

3. In a calculating machine, a rotatable chart table adapted to receive a chart, a pivoted stylus for following line recordings on the chart, a pivoted member for imparting movement to the stylus, a cam face on said pivoted member so constructed and related to the stylus as to impart a proportional movement thereto, and a counting device, a counter wheel on the counting device engaging the chart table and actuated by rotative movement thereof, a rectilinear guide for the counting device, a slidable support carrying said counting device, and positioned in the guide, said guide being so related to the chart table as to direct the counting device diametrically thereon, and linkage between the pivoted member and the slidable support for proportionately moving the counting device as the pivoted member is moved.

4. In a calculating machine, a frame, a rotatable chart table carried by the frame and adapted to receive a chart, a stylus pivotally supported on the frame and swingable over the chart table, a cam pivoted at one end to the frame and swingable over the chart table, a counting device mounted on the fame and rectilinearly movable over the chart table, said counting device resting on the chart table and actuated by rotation thereof, said stylus and cam being so constructed and related that movement of the cam will result in proportional movement of the stylus connecting members between, said cam and counting device so constructed and arranged that movement of the cam will result in proportional movement of the counting device diametrically on the chart table.

5. In a calculating machine, a T-frame, a rotatable chart table carried at the juncture of the legs of the frame and adapted to receive a chart, a stylus pivotally supported on one leg of the frame and swingable over the chart table, a cam pivoted at one end to another leg of the frame and engaging the stylus to impart proportional movement thereto, a rectilinear guide carried by the first mentioned leg of the frame and extending diametrically over the chart table, a counting device slidably carried by the rectilinear guide and movable over the chart table, said counting device engaging the chart table and actuated by rotation thereof, linkage between said cam and said counting device whereby rectilinear movement is imparted to the counting device upon pivotal movement of the cam.

6. The structure as specified in claim 5, the cam pivot carrying a gear segment, a second gear segment concentric with the chart table and in engagement with the first-mentioned gear segment, and a handle on the second-mentioned gear segment for imparting rotative movement to the gear segments and swinging movement to the cam.

7. In a calculating machine, a rotatable chart table adapted to receive a chart, a stylus for following line recordings on the chart, a cam actuating the stylus, a pivotable cam support supporting said cam clear of the chart table, a counting device, a counter wheel on the counting device engaging the chart table and rotatively movable when the chart table is rotated, a support for the counting device, a gear segment on the pivotable cam support, a second gear segment engaging the first mentioned gear segment, an operating handle on the second gear for imparting movement to the gear segments and the cam, link members between the counting device and the cam whereby movement of the cam will impart longitudinal movement diametrically across the chart table of the counting device on its support.

8. In a calculating machine, a rotatable chart table adapted to receive a chart, a stylus for following line recordings on the chart, a cam actuating the stylus, a pivotable cam support supporting said cam clear of the chart table, a counting device, a counter wheel on the counting device engaging the chart table and rotatively movable when the chart table is rotated, a support for the counting device, link members between the counting device and the cam whereby movement of the cam will impart longitudinal movement diametrically across the chart table of the counting device on its support, a gear segment on the pivotable cam support, a second gear segment concentric with the chart table and engaging the first mentioned gear segment, an operating handle on the second gear segment for imparting movement to the gear segments and the cam.

References Cited in the file of this patent

UNITED STATES PATENTS

| Number | Name | Date |
|---|---|---|
| 543,492 | Laughlin et al. | July 30, 1895 |
| 927,338 | Durand | July 9, 1909 |
| 1,205,068 | Weymouth | Nov. 14, 1916 |
| 1,323,349 | Chubb | Dec. 2, 1919 |
| 1,597,053 | Cherry | Aug. 24, 1926 |
| 1,748,783 | McGaughy | Feb. 25, 1930 |
| 1,867,441 | Dall | July 12, 1932 |
| 1,875,019 | Koeppen, Jr. | Aug. 30, 1932 |
| 1,887,593 | Guman | Nov. 15, 1932 |
| 2,057,664 | McGaughy | Oct. 20, 1936 |
| 2,212,323 | Martin | Aug. 20, 1940 |
| 2,458,009 | Lory | Jan. 4, 1949 |

FOREIGN PATENTS

| Number | Country | Date |
|---|---|---|
| 562,440 | France | Sept. 5, 1923 |